June 3, 1924.
A. L. POWELL
1,496,490
TRANSMISSION FOR ENGINES
Original Filed May 3 1921
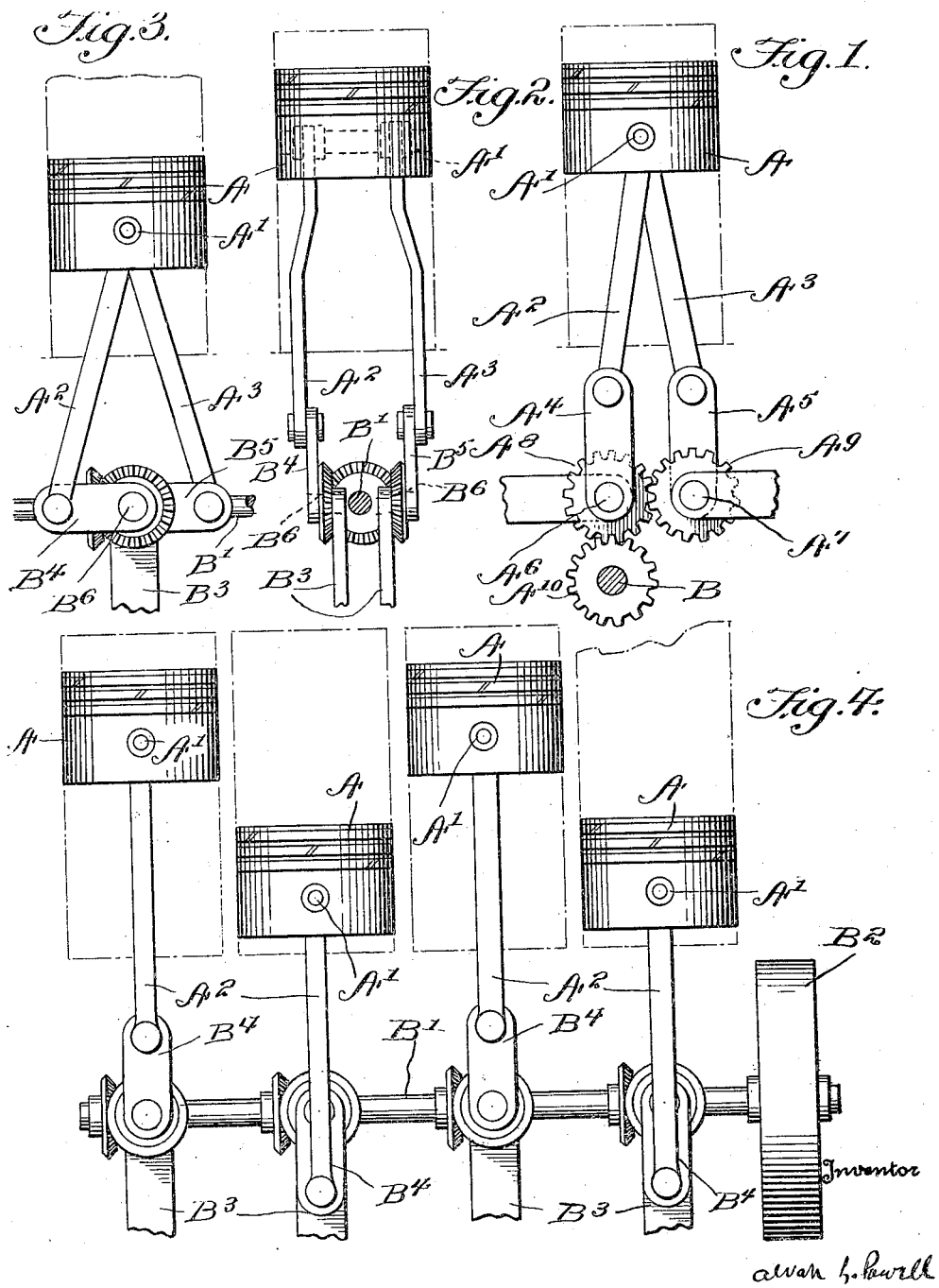

Patented June 3, 1924.

1,496,490

UNITED STATES PATENT OFFICE.

ALVAH L. POWELL, OF MILES CITY, MONTANA, ASSIGNOR TO THE A. L. POWELL POWER CO., INC., OF MILES CITY, MONTANA, A BODY CORPORATE.

TRANSMISSION FOR ENGINES.

Application filed May 3, 1921, Serial No. 466,591. Renewed December 22, 1922.

*To all whom it may concern:*

Be it known that I, ALVAH L. POWELL, a citizen of the United States, residing at Miles City, in the county of Custer and State of Montana, have invented certain new and useful Improvements in Transmission for Engines, of which the following is a specification.

My invention relates to improvements in transmission for engines in which I provide means for eliminating piston side slap. In the annexed drawings I show an application of my invention in which—

Fig. 1 is an elevation of a form of the invention.

Figs. 2, 3, 4, are elevations, from different view points, of a modification of my improvement.

In Fig. 1, a piston A is fitted with a wrist pin $A^1$, from which depends two piston rods $A^2$, $A^3$. These rods engage cranks $A^4$, $A^5$. The cranks are mounted on stub shafts, $A^6$, $A^7$, mounted in any convenient part of the frame. On said shafts there are fitted gears, $A^8$, $A^9$. The cranks and gears are fixed to rotate together. The gears $A^8$ and $A^9$ mesh as shown. A third gear $A^{10}$, on a power shaft B, meshes with the gear $A^8$.

It is evident that on the downstroke of piston the piston rods will impart movement to the cranks, and these, by the momentum of engine and power will move in a circle. The gears $A^8$, $A^9$ will rotate in opposite directions but at the same speed, the movement being transmitted to the power shaft B by the gear $A^{10}$.

In Figs. 2, 3, 4, I show a modification of my invention. In this the cranks act as in my prior construction, but the movement is imparted to bevel gears, as shown, and these rotate a shaft, $B^1$, on which is a balance wheel, $B^2$. Supporting means for the stub shafts that support the intermediate driving bevel gears, are shown in Fig. 2, at $B^3$. In the modification, the cranks $B^4$, $B^5$, are mounted on stub shafts $B^6$ which have a common axis.

It will be noted that I use gears of a diameter smaller than that of the crank circle.

The action of the double piston rods causes the piston to move perfectly and uniformly, the pressure on each side being equal.

What I claim as new and ask to have protected by Letters Patent is,

In a transmission for engines, the combination of cylinders, pistons slidable in said cylinders, connecting rods, means for attaching said connecting rods to said pistons, cranks; means for attaching said connecting rods to said cranks; a power shaft, stub shafts, means for mounting said stub shafts at right angles to said power shaft, stub shaft bevel gears, means for rotating said stub shaft bevel gears by said cranks, and bevel gears on said power shaft in mesh with the stub shaft bevel gears, for the purpose and in the manner herein described.

In testimony whereof I affix my signature.

ALVAH L. POWELL.